Figure 1:
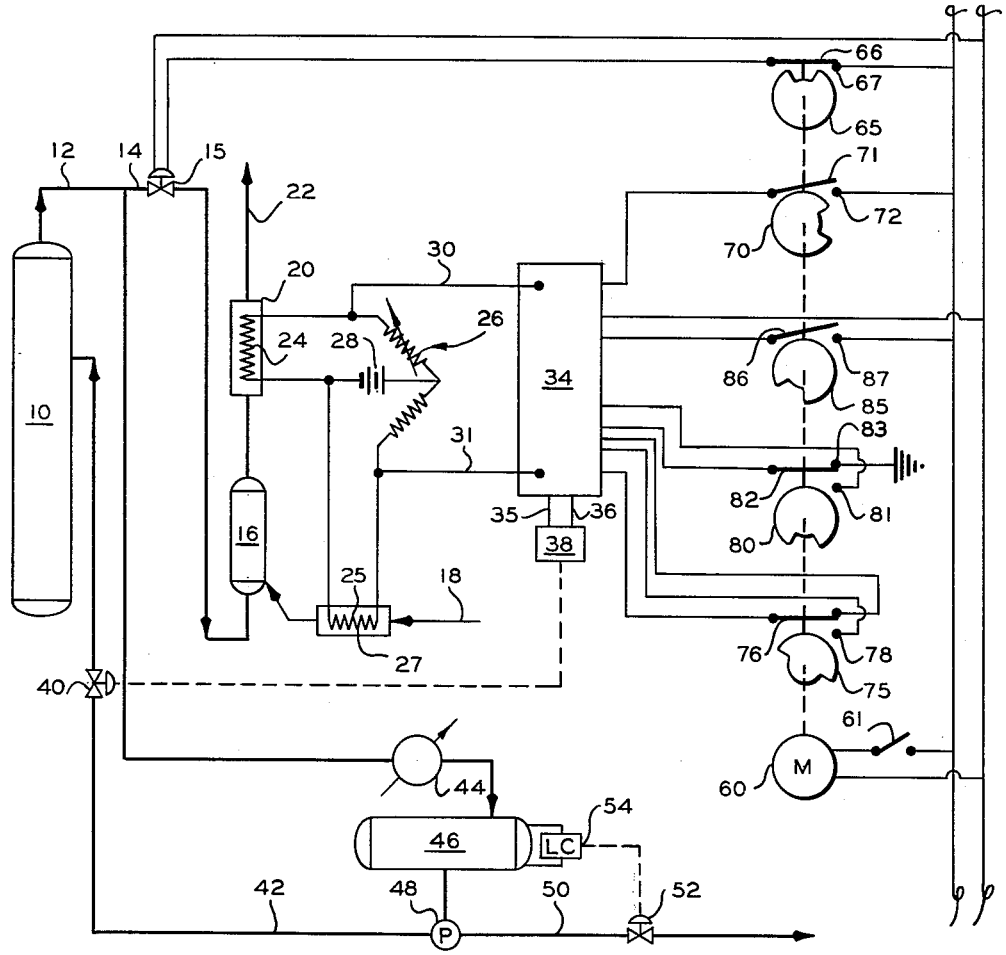

Aug. 21, 1962

R. L. KINDRED ETAL 3,049,908

PROGRAMMER-INTEGRATOR FOR CHROMATOGRAPHIC ANALYZER

Filed Aug. 15, 1958

2 Sheets-Sheet 1

INVENTORS
R.L. KINDRED
M.C. BURK

BY Hudson & Young

ATTORNEYS

INVENTORS
R.L. KINDRED
M.C. BURK
BY Hudson & Young
ATTORNEYS though shown as an overhead stream this could well be a side draw, reflux, feed or kettle product stream. If necessary, means are provided for maintaining the sample in a vaporous state during elution. A sample line 14 removes a measured sample from the conduit 12 to a sampling valve 15 which is timer operated as will be hereinafter described. The valve 15 measures a sample and passes it to the chromatographic column 16 which is packed with material such as Linde molecular sieve, sold by Union Carbide and Carbon Corporation, or with either crushed firebrick or diatomaceous earth coated with dimethylsulfolane. A carrier gas is then directed through the column from a conduit 18 to elute components of the measured sample from the column into a detector cell 20 wherein a measurement is made. Gases are vented from the cell by the vent line 22.

3,049,908
PROGRAMMER-INTEGRATOR FOR CHROMATOGRAPHIC ANALYZER

Raymond L. Kindred and Marvin C. Burk, Bartlesville, Okla., assignors to Phillips Petroleum Company, a corporation of Delaware
Filed Aug. 15, 1958, Ser. No. 755,312
15 Claims. (Cl. 73—23)

This invention relates to means for controlling processes from composition analyses rendered by a chromatographic analyzer. In one specific aspect it relates to an electrical circuit for integrating the area under an elution curve and for applying a signal representative of the integration to process control apparatus.

In vapor phase chromatography a measured sample is placed in a packed column. This sample is then eluted by passing a carrier gas such as helium through the column. The various gases that make up the sample will be eluted from the column by the carrier gas in a fixed order. When the packed column is associated with suitable apparatus, such as a recorder, a series of curves will be generated by measuring the eluted gas stream. These curves comprise a series of peaks with each peak indicating a certain component (or in certain cases, two components), of the measured sample. The height of each peak indicates the concentration of the component which the peak represents.

It has been proposed to control processes, e.g., fractionation of hydrocarbons, by selecting one component as the control or key component, providing means for reading its peak height, and applying a signal representative of this height to process control apparatus, e.g., a recorder controller. Such an apparatus is disclosed in the pending application Serial No. 727,606 by M. C. Burk, entitled "Chromatographic Analyzer Peak Reader," filed April 10, 1958.

Sometimes, however, a number of problems arise: the key component has poor resolution, i.e., its elution curve overlaps that of another component, or a single peak may represent a number of components. At times it may be desired to control from such a curve or peak. The instant invention provides a means for control in such situations. Briefly, this is accomplished by integrating the area under selected portions of the elution peak, and employing the integrated signal to operate control means. Apparatus for doing this includes timed switching means to activate, zero (compensate for instrument drift), and to cut off an integrating circuit. Timed switching is feasible because of the fixed, predictable order of elution. The integrated signal is stored for a short time and then is used to operate a servo motor which moves to control position responsive thereto. A chromatographic column, suitable valving for taking samples and purging the column, and associated measuring apparatus are included.

It is an object of this invention to provide means for controlling a process from a composition analysis rendered by a chromatographic analyzer. It is still another object to do this by providing means to integrate the elution response of the analyzer over preselected periods of time and to actuate process control apparatus responsive to the integrated signal. Other objects and advantages will become apparent from the following disclosure.

Figure 2:
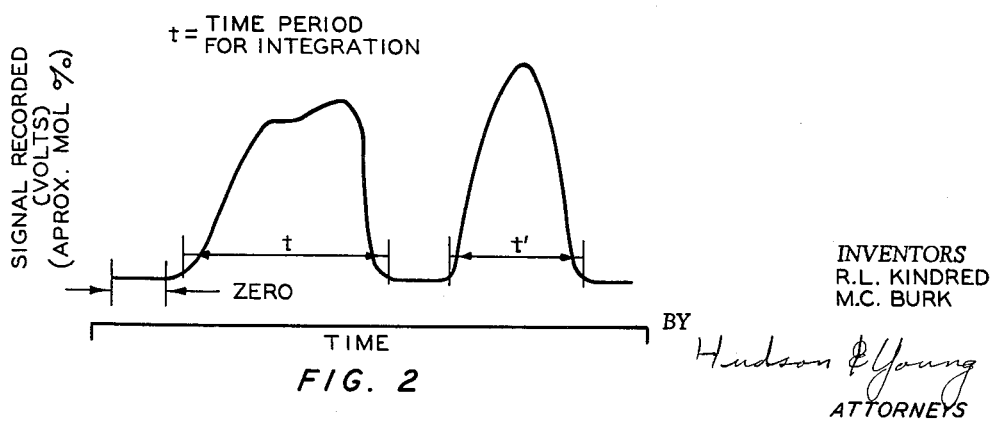
Figure 3:
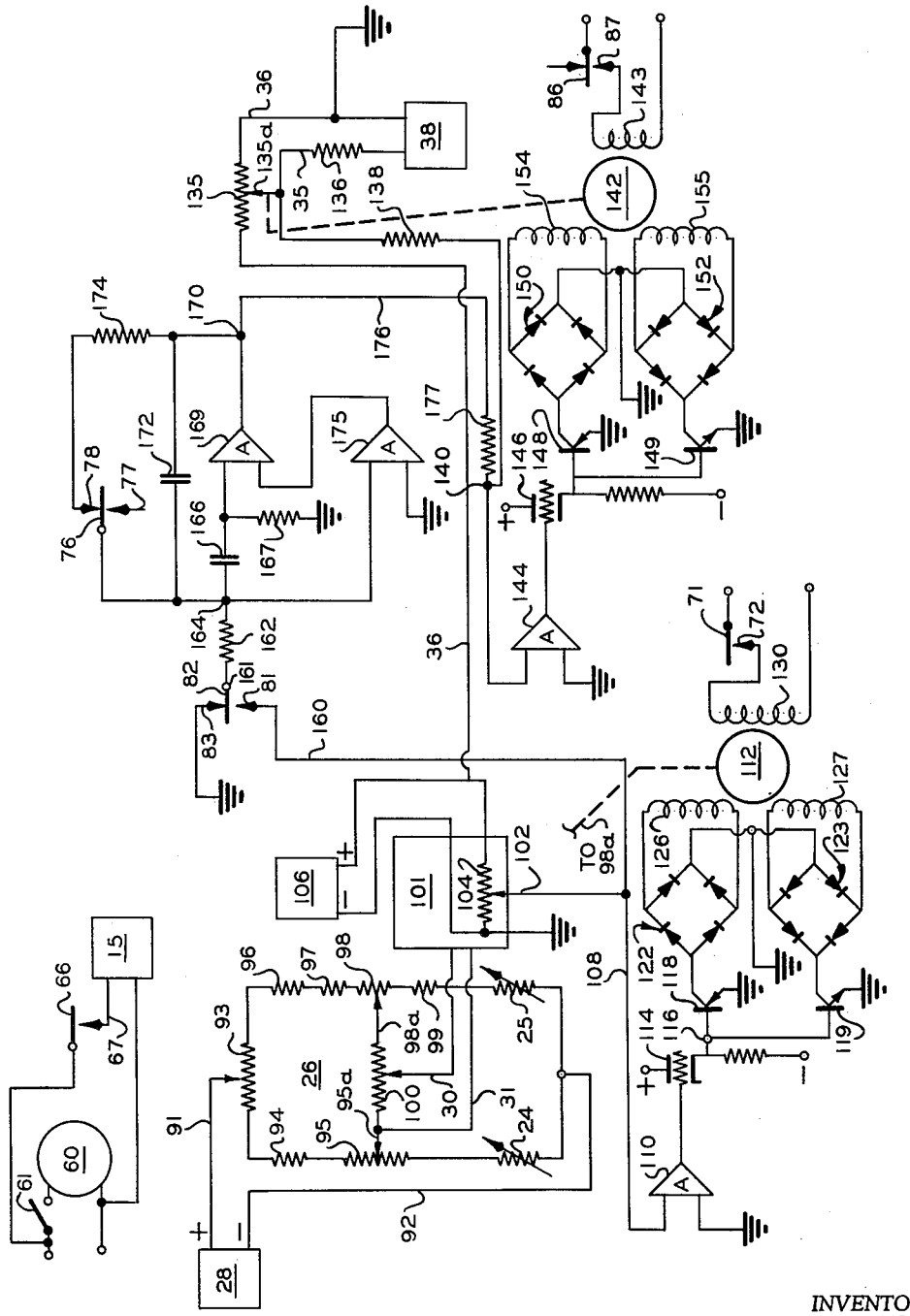

In the drawings:
FIGURE 1 shows schematically a fractionator control system that includes the instant invention;
FIGURE 2 is representative of one type of elution curve from which control by the instant invention is possible;
FIGURE 3 shows schematically the details of the integrator and apparatus for process control.

Referring now to FIGURE 1, there is shown a system employing a programmer-integrator which is operatively associated with a chromatographic analyzer, a recorder controller and a control valve for controlling a process.

A product stream leaves a fractionating column 10 via a conduit 12. Although shown as an overhead stream this could well be a side draw, reflux, feed or kettle product stream. If necessary, means are provided for maintaining the sample in a vaporous state during elution. A sample line 14 removes a measured sample from the conduit 12 to a sampling valve 15 which is timer operated as will be hereinafter described. The valve 15 measures a sample and passes it to the chromatographic column 16 which is packed with material such as Linde molecular sieve, sold by Union Carbide and Carbon Corporation, or with either crushed firebrick or diatomaceous earth coated with dimethylsulfolane. A carrier gas is then directed through the column from a conduit 18 to elute components of the measured sample from the column into a detector cell 20 wherein a measurement is made. Gases are vented from the cell by the vent line 22.

The detector cell includes a thermistor 24 that forms one branch of a bridge circuit 26. Thermistor 25 is another branch of the bridge disposed in a reference cell 27 through which flows a carrier gas stream. These thermistors carry out the measurements that result in a curve such as FIGURE 2. In the apparatus shown, the thermistors 24 and 25 are heated by means of electrical energy applied thereto from the battery 28 and the gases that flow past these thermistors cool them. The amount of heat removed from the respective elements 24 and 25 is indicative of both the amount of and thermoconductivity of the component being eluted. The identification of a particular component is related to time. This will be discussed in further detail with respect to FIGURE 2. Thermistors 24 and 25 could as well be bolometers, glow discharge elements, or other such means as well as thermistors.

A signal is transmitted from the output terminals of the bridge 26 through the conductors 30 and 31 to the programmer-integrator 34. The conductors 35 and 36 transmit a signal from the element 34 to a recorder controller 38 which produces a control signal to adjust the valve 40 in a process stream.

The valve 40, as shown, is disposed in the reflux line 42. The reflux is attained by the overhead stream passing through condenser 44 into an accumulator 46 from whence it is removed to a reflux pump 48. Connected to the discharge of the pump are the reflux line 42 and the product line 50 which has a valve 52 therein controlled by a liquid level controller 54 connected to the accumulator.

FIGURE 1 also shows the timing motor 60 which operates cams 65, 70, 75, 80 and 85, to position, respectively, switches 66, 71, 76, 82 and 86 in their numerical order. The operations thus carried out comprise operating the sampling valve 15 to take a measured sample (cam 65, switch 66), closing the switch 71 by cam 70 to automatically zero the bridge in order to correct it for any cumulative errors or drift, and closing the switch 76 with the cam 75 to prepare the circuit for integration. Following this the cam 80 moves switch 82 to program in an integrating operation by turning on and then turning off the integrator 34. A signal representative of the integration is temporarily stored in the integrator. After the integration has been carried out, the cam 85 then operates switch 86 to operate a servo-motor to adjust certain apparatus (hereinafter described with respect to FIGURE 3) within the integrator 34 which results in a signal being sent to the recorder 38, following which the cam 75 prepares the circuit for the next sequence of events. As shown, the cams 65, 70 and 85 operate alternating current (A.C.) circuits. The cams 75 and 80 operate direct current (D.C.) circuits and also move their respective switches between two contacts. This will be described in greater detail hereinafter with respect to FIGURE 3.

Referring now to FIGURE 2 there is shown a curve which demonstrates or is exemplary of a recorded curve wherein poor resolution of the components has been obtained from the column 16. Such a peak would be generated by isobutylene and butene-1 in the presence of each other in any mixture of hydrocarbons wherein the column 16 is packed with diatomaceous earth coated with dimethylsulfolane. Because of the poor resolution it is desired to obtain by integration the area under the curve and use a signal representative thereof for control. At times this area may represent a group of components, e.g., total butylenes, rather than one specific component. The area is proportional to and representative of the mole percent of these components and is denoted as that occurring during time interval "$t$." Similarly, the time interval for automatically compensating the bridge is denoted as "zero."

In FIGURE 3 there is shown the timing motor 60 connected to an A.C. source by a starting switch 61. The motor drives a plurality of cams as shown in FIGURE 1 and is preferably synchronous. The cam 65 operates the contactor of switch 66 to contact 67 which in turn operates the sample valve 15. The D.C. power supply 28 supplies power through leads 91 and 92 to the bridge 26. In the left hand branches of the bridge resistors 93, 94 and 95 and thermistor 24 are series connected between the leads 91 and 92. In the right hand branches of the bridge, resistors 96, 97, 98, 99 and thermistor 25 are series connected between the leads 91 and 92. An attenuator 100 is connected by adjustable contactors 95a and 98a between resistors 95 and 98. Resistor 98 and contactor 98a comprise a zeroing potentiometer. The leads 30 and 31 connect the attenuator 100 to a recorder 101, or other bridge balancing means, which is internally disposed of the element 34. The pen or other indicating means of the recorder 101 is mechanically linked to a contactor 102 of a telemetering slide wire 104, the terminals of which are connected to a D.C. power supply 106, and one terminal of which is connected to ground. Separate D.C. power supplies 28 and 106 are preferred instead of one (which could be used) because the arrangement shown permits isolation of the bridge whereas the use of a single power supply would require grounded connections on the bridge which would then permit stray ground currents and voltages to leak into the bridge and affect its accuracy.

The zero circuit includes a lead 108 that connects the contactor 102 to servo amplifier 110 in order to provide power to a zero motor control circuit. In the preferred embodiment this power is applied to the control windings of a shaded pole motor 112. This signal from amplifier 110 is applied to the control grid of a triode 114 which has a positive bias supplied to its anode and a negative bias to its cathode. The signal is taken off the cathode and applied to parallel control winding circuits at junction 116. Each of these control winding circuits comprise, respectively, a transistor 118, 119; a full wave rectifier 123, 122 that includes four diodes or equivalents; and the control windings 126, 127 of the motor 112.

The polarity of the signal appearing at junction 116 during zeroing determines which of the respective control windings 126 and 127 is activated, and thus the direction in which the zero motor 112 will rotate when its field 130 is energized. The zero motor is mechanically linked to the contactor 98a to adjust the bridge 26. The zero circuit is actuated when the field of the motor 112 is energized by the cam 70 moving switch 71 to a contact 72.

Power from the supply 106 is supplied through a series circuit comprising the lead 36, a potentiometer 135, and a grounded connection common to 135 and to the recorder controller 38. The other terminal of controller 38 receives power from the contactor 135a of the potentiometer, the lead 35 and the resistor 136. Contactor 135a is also connected through a resistor 138 to a junction 140 which is the input terminal for the output signal servo circuit. The contactor 135a is mechanically driven by the servo motor 142 responsive to activation of its field 143 by the cam 85 moving switch 86 against a contact 87. The motor 142 is preferably a shaded pole motor. The direction and amount of rotation of the motor 142, hence the motion of the contactor 135a is determined by the polarity and size of the signal that appears at junction 140 and is applied to a servo amplifier 144, a biased triode 146, thence to parallel control winding circuits each comprising transistors 148 and 149; rectifiers 150 and 152; and control windings 154 and 155. The servo circuit comprises the control circuit for the motor 142 (and the motor) and is substantially the same as for the zero circuit. The output signal servo circuit is activated when the cam 85 moves switch 86 against contact 87 to energize field 143.

The integrating circuit proper receives its input signal through a lead 160 which is connected between the contactor 102 and the contact 81. The switch 82 is moved by cam 80 between the contacts 81 and 83. When the switch is against the contact 81 the signal from the telemetering slide wire 104 is applied to the input terminal 161 of an integrating circuit, thence through a resistor 162 to a junction 164.

The integrator comprises resistor 162 in series with a number of parallel circuits connected to the junction 164. The first of these comprises a circuit through a capacitor 166, a grounded resistor 167 to a first input terminal of an operational amplifier 169. The output of this amplifier is applied to a junction 170. In parallel with this first circuit is a capacitor 172. In parallel with both of these is a circuit that comprises the switch 76 which is connected to the junction 164 and is operated by cam 75 between the contacts 77 and 78. In series between the contact 78 and the junction 170 is a resistor 174. Connected between the junction 164 and a second input terminal of the amplifier 169 is a stabilizing amplifier 175, which has one input terminal connected to ground. A lead 176 connects the junction 170 to the junction 140 through a resistor 177.

A cycle of events in the operation of the aforementioned apparatus will now be described. Referring first to FIGURE 1, the column 10 is assumed to be in operation with a stream of material passing through the conduit 12 to the accumulator 46 and reflux flowing through the line 42 back to the column. The switch 61 is closed and the timing motor 60 is started. The cam 65 makes a contact between switch 66 and contact 67 to operate the sample valve 15. After a measured sample has been placed in the column 16 the carrier gas entering through 18 elutes the sample to the detector cell 20 wherein the thermistor 24 senses a change in the composition of the stream passing therethrough to the vent 22.

After the sample valve 15 has been operated but before any integration takes place, the bridge 26 is zeroed by the cam 70 making a contact between switch 71 and the contact 72. Of course, it may be necessary to zero before sampling if the key component is among the first to be eluted. This actuates the motor field 130 which causes the motor 112 to adjust the contactor 98a if there is any unbalance sense in the bridge circuit. If there is any unbalance in the bridge 26 it will appear in the leads 30, 31 and result in adjustment of the contactor 102. A signal appears on 108 and is amplified in the amplifier 110 and applied to the junction 116. The polarity and size of the signal appearing on 108 will short out one of the control windings 126, 127 and cause the motor 112 to operate in a certain direction to adjust the contactor 98a to thereby zero the bridge by reducing the signal between 30 and 31 to a predetermined minimum, preferably to zero. As is shown in FIGURE 2, zeroing is accomplished when no elution curve is being generated. In response to this movement of 98a, recorder 101 and contactor 102 move to new positions.

After the sample has been taken and the bridge has been zeroed, the next operation is to operate the cam 75 to move switch 76 against contact 77. This prepares the circuit for the integration procedure and the position of the switch 76 remains the same until after integration and readout has been completed.

As a refinement for more perfect zeroing it may be desirable to reduce the attenuation of the zero signal across 100. This is done by actuating a relay when 71 contacts 72. The relay then disconnects line 30 from the arm of 100 and connects line 30 directly to arm 98a.

Next, cam 80 moves switch 82 against the contact 81 thereby applying the signal from the bridge to the integrating circuit 161. The signal that is integrated is that on telemetering slidewire 104. Telemetering and recorder 101 provide an effective or apparent amplification. This is advantageous since it lowers the order of sensitivity required for the integrator, zero, and output circuits. The portion of the circuit through amplifier 175 provides stability. The circuit that includes amplifier 169 and the parallel circuit with capacitor 172 perform the integrating. The capacitor 172 stores the integrated signal thereon. This integrated signal then is impressed via junction 170 and lead 176 on the resistor 177 and appears at junction 140 where it is compared with the signal from potentiometer contactor 135a that has been applied through resistor 138 to the junction 140. The algebraic sum of these two signals is then applied to the one terminal of amplifier 144 thence to the control winding circuit of motor 142.

No change takes place until the cam 80 moves switch 82 to contact 83. This terminates the integration, but the signal remains stored on 172 and the sum at 140 remains the same.

Then cam 85 connects the motor field 142 to power source through the switch 86. When thus activated the motor 142 moves responsive to the amplified summed signal that appears at junction 140 and adjusts the contactor 135a until the sum of the signals appearing at junction 140 becomes a predetermined minimum, preferably zero. At this time the motor ceases to move the contactor 135a. At some predetermined time subsequent to this the cam 85 shuts off the power to motor 142 by moving the switch 86 away from the contact 87. Shortly thereafter the cam 75 then moves switch 76 against the contact 78 and discharges the capacitor 172 through resistor 174. The circuit is now prepared for the next cycle of events.

When the contactor 135a has been moved to a new position by motor 142 the recorder controller 38 receives a new signal, and responsive thereto provides a control signal to adjust the position of the valve 40. The control signal may be electrical, pneumatic, or hydraulic. Of course, other means of effecting process control could be achieved instead of adjusting the reflux, e.g., in a debutanizer using a chromatographic analyzer for measuring isopentane in the overhead vapors, which are mostly butane (the measurement is preferably off 9th tray from the top of the column) and resetting the steam rate responsive to the isopentane concentration.

In an actual embodiment, the amplifiers used in the integrating circuit and in the motor control circuits were manufactured by the George A. Philbrick Researches, Inc., Boston, Mass. Amplifier 169 was a phase-reversing negative feedback type denoted by Philbrick as model K2–X as described in the "Applications Manual for Philbrick Octal Plug-In Computing Amplifiers," copyright 1956. Amplifiers 110, 144, and 175 were chopper amplifiers denoted in said manual as model K2–P. Amplifiers 110 and 144 were modified to provide short time constants on the order of 0.22 second. This was done by removing the 1 mfd. capacitor connected between the output terminal and ground (octal plugs numbered 6 and 4, respectively) and replacing it with one having a capacitance of 0.1 $\mu$fd.

The instant invention has been disclosed as suitable for effecting measurements and process control for situations where the material being tested has poor resolution from a chromatographic column. Other applications should be apparent to those skilled in the art. For example, it would be possible by closely timing the beginning and end of the integrating operation to effect control from a single peak by integrating over a period of time $t'$, as illustrated in FIGURE 2. Where this is done it is necessary that the beginning and end of the time period be selected to include the maximum value of the peak therebetween.

What we claim is:

1. Process control apparatus comprising a chromatographic column having an inlet and an outlet; a sample measuring valve connected to said inlet; a sample cell connected to said outlet; a Wheatstone bridge circuit comprising first and second output terminals, a branch of the bridge being disposed in said sample cell, a zeroing potentiometer comprising a resistor connected between branches of said bridge circuit and a contactor, and means for connecting said contactor to one of said bridge output terminals; zero, integrating, and output signal servo circuits; a second potentiometer having a contactor; a direct current potential source connected to one terminal of said second potentiometer; means for providing to said zero and integrating circuits signals representative of the signals appearing between said bridge output terminals; means for adjusting said zeroing potentiometer contactor responsive to said zero circuit; means for algebraically summing the signal from said integrating circuit and the signal from said second potentiometer contactor and for applying the summed signal to said output signal servo circuit; means for actuating said sample measuring valve for a first predetermined period of time; means for actuating said zero circuit for a second predetermined period of time; means for actuating said integrating circuit for a third predetermined period of time; and means for actuating said output signal servo circuit after said third period of time.

2. The apparatus of claim 1 wherein said means for integrating comprises a junction; an amplifier having first and second input terminals and an output terminal; a first capacitor; a resistor connected at one end to a source of potential; and means for connecting in series said junction, said first capacitor, the other end of said resistor, and said first input terminal; a second capacitor; and means for connecting said second capacitor between said junction and said amplifier output terminal and in parallel with said first capacitor and amplifier.

3. The apparatus of claim 2 further comprising a switch; means for connecting said switch to said junction; a second resistor having one end connected to said amplifier output terminal; and means for connecting the said switch to the other end of said second resistor for a fourth predetermined period of time that includes said third period of time.

4. The apparatus of claim 1 further comprising a means for adjusting said second potentiometer contactor responsive to said output signal servo circuit.

5. The apparatus of claim 1 further comprising means for responding to the signal from said second potentiometer contactor; and means for applying said signal from said second potentiometer contactor to said means for responding.

6. The apparatus of claim 5 wherein said means for responding comprises a recorder-controller.

7. A circuit adapted for combination with a chromatographic analyzer comprising a Wheatstone bridge circuit comprising first and second output terminals, a zeroing potentiometer comprising a resistor connected between branches of said bridge circuit and a contactor, and means for connecting said contactor to one of said bridge output terminals; zero, integrating and output signals servo circuits; a second potentiometer having a contactor; a direct current potential source connected to one terminal of said second potentiometer; means for providing to said zero and integrating circuits signals representative of the signals appearing between said bridge output terminals; means for adjusting said zeroing potentiometer contactor responsive to said zero circuit; means for algebraically summing the signal from said integrating circuit and the signal from said second potentiometer contactor and for applying the sum signal to said output signal servo circuit; means for actuating said zero circuit for a first predetermined period of time; means for actuating said integrating circuit for a second predetermined period of time; and means for actuating said output signal servo circuit after said second period of time.

8. The apparatus of claim 7 wherein said means for integrating comprises a junction; an amplifier having first and second input terminals and an output terminal; a first capacitor; a resistor connected at one end to a source of potential; and means for connecting in series said junction, said first capacitor, the other end of said resistor, and said first input terminal; a second capacitor; and means for connecting said second capacitor between said junction and said amplifier output terminal and in parallel with said first capacitor and amplifier.

9. The apparatus of claim 8 further comprising a switch; means for connecting said switch to said junction; a second resistor having one end connected to said amplifier output terminal; and means for connecting the said switch to the other end of said second resistor for a fourth predetermined period of time that includes said third period of time.

10. The apparatus of claim 7 further comprising a means for adjusting said second potentiometer contactor responsive to said output signal servo circuit.

11. The apparatus of claim 7 further comprising means for responding to the signal from said second potentiometer contactor; and means for applying said signal from said second potentiometer contactor to said means for responding.

12. The apparatus of claim 11 wherein said means for responding comprises a recorder-controller.

13. The apparatus of claim 7 wherein said means for providing to said integrating circuit signals representative of the signals appearing between said bridge output terminals, and said means for actuating said integrating circuit for a second predetermined period of time comprise means for connecting said bridge output terminals to said integrating circuit for a pre-selected interval of time.

14. The apparatus of claim 7 wherein said output signal servo circuit comprises a servo-motor having field windings and control windings, and means for applying power to said field windings, whereupon said servo-motor rotates responsive to the signal applied to said control windings; wherein said means for applying the sum signal to said output signal servo circuit comprises means for applying said sum signal to said control windings; and further comprising means for driving said second potentiometer contactor responsive to the rotation of said servo-motor to reduce to zero the sum signal from said means for algebraically summing.

15. The apparatus of claim 14 wherein said means for applying power comprises means for applying power to said field windings for a predetermined period of time.

References Cited in the file of this patent
UNITED STATES PATENTS

| | | |
|---|---|---|
| 2,542,160 | Stoner et al. | Feb. 20, 1951 |
| 2,756,378 | Davis | July 24, 1956 |
| 2,826,908 | Skarstrom | Mar. 18, 1958 |

OTHER REFERENCES

Article: Gas Chromatography, published in Analytical Chemistry, Vol. 28, No. 3, March 1956, by Dimbat et al., pages 290–297. (Copy in 73–23C.)

Article: "Gas Chromatography," published in Oil & Gas Journal, Dec. 17, 1956, pages 133, 134. (Copy in 73–23c.)

Article: Gas Chromatography in Plant Streams, by D. H. Fuller in ISA Journal, November 1956, pages 440–444. (73–23c.)